Oct. 6, 1931.  E. C. LOETSCHER  1,825,877
COMPOSITION FLOORING AND METHOD OF MAKING THE SAME
Filed June 7, 1930
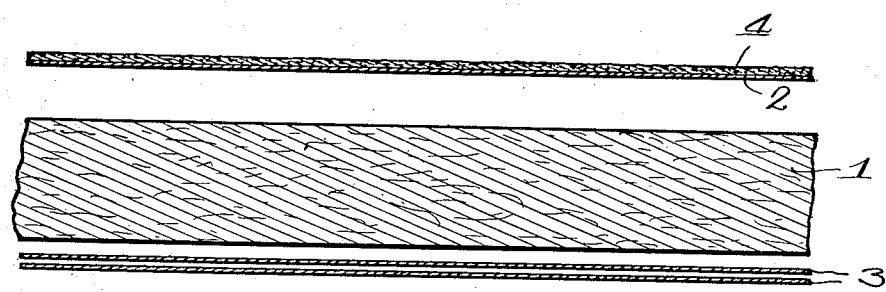
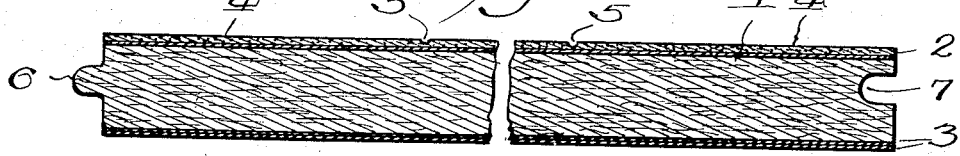
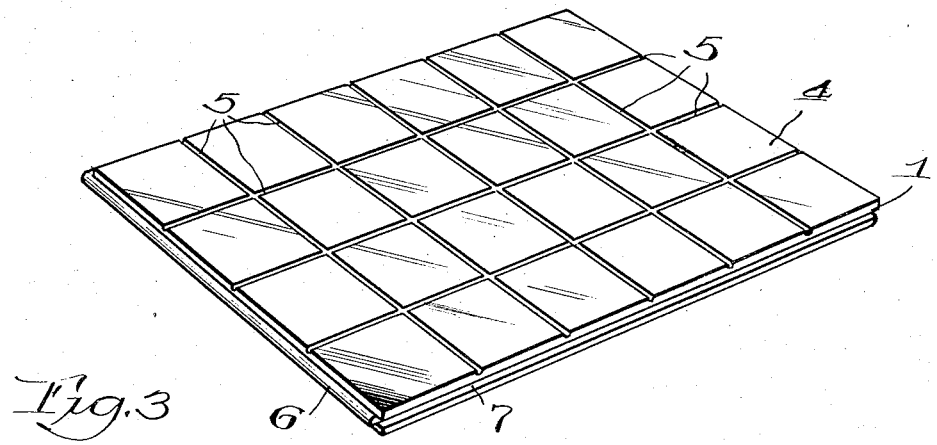

Patented Oct. 6, 1931

1,825,877

UNITED STATES PATENT OFFICE

EMIL C. LOETSCHER, OF DUBUQUE, IOWA

COMPOSITION FLOORING AND METHOD OF MAKING THE SAME

Application filed June 7, 1930. Serial No. 459,642.

This invention relates to improvements in composition flooring and more particularly to a composite material having a compressed fibrous base and a surface coating composed of a suitable mineral in pulverized or granular form compounded with resinous substance such as bakelite. The object of the invention is to provide a practical and relatively inexpensive substitute for tile and cementitious compositions more commonly used for flooring or floor coverings.

A preferred embodiment of my invention including the method of producing the same is disclosed in the accompanying drawings, in which Figure 1 is a view showing the several layers of the composite material that make up the product as they are assembled prior to finishing process.

Figure 2 is a sectional view through a sheet of the finished product, and

Figure 3 is a perspective view of a sheet of the flooring material ready to be laid.

Considering first the character of the composite material, the base or foundation 1 is a relatively thick layer of compressed fibrous material, composed of highly compressed cellulose fibre such as wood pulp, cornstalk or bagasse or any one of several commercial sheet materials of a fibrous composition. Covering the surfaces of the base material are top and bottom layers of paper 2 and 3 impregnated with bakelite and adhering to the upper layer of paper 2 is a coating or layer 4 composed of a mixture of pulverized mineral such as quartz, granite or other hard mineral substance and fused bakelite.

As will be presently seen, the several materials that make up the finished product are first prepared separately and then assembled, the final operation being that of compressing them together in the presence of heat sufficient to unite the several layers into a composite sheet having a hard wear-resisting surface having the appearance and characteristics of a smooth stone or ceramic tile surface. As a preferable form for laying, the sheets are produced in fairly large sizes, say, from 6 to 8 feet in length and from 1½ to 2 feet in width, so that they can be readily handled, and since they have a fibrous base the sheets can be nailed to the sub-floor. As shown in Figure 3, the top surface of the sheets is divided into squares to resemble tile, and their edges are tongued and grooved so that they can be joined together to insure evenness along the joints. In this form the sheets can be laid in much the same manner as matched wood flooring, the nails being either driven through the edges at an angle so the heads are concealed, or along the grooves in the surface, the heads of the nails countersunk and the holes filled with cement or putty.

The preferred method of making the flooring material will be understood from the following: The base material 1, which, as already stated, may be any commercial board of a fibrous composition, is prepared by coating its surfaces and edges with bakelite varnish, that is, a solution of bakelite and, say, 25% of alcohol as the solvent. The sheets may be sprayed or passed through a bath of the bakelite solution, whichever is more convenient, and then dried in an oven, thereby driving off the solvent. Now sheets of relatively tough paper such as the grade known as "kraft" is similarly prepared by passing the same through a bath of the bakelite solution and drying them to drive off the solvent, although the surfaces will remain in a somewhat tacky condition.

And finally the mineral substance is prepared, this being done by covering a mass of granulated or pulverized quartz, for instance, with the same bakelite solution, and after draining off the excess of the solution, the mass is likewise dried in an oven until the solvent has been evaporated.

In treating pulverized material it is desirable that each granule be completely covered with bakelite and therefore care is taken to thoroughly stir or agitate the mixture before it is dried. After the drying process there will be more or less adherence of the granulated particles into a conglomerate mass, and therefore it is ordinarily necessary to separate them by moderate crushing to break up the mass and separate the coated particles from each other. This may be readily accomplished by passing the dried granular mass through a tumbling mill.

The several prepared materials are now ready to be assembled: A layer of the bakelite treated granular material is spread in a thin layer of uniform thickness over the surface of one of the sheets of paper, and the same is then placed upon the sheet of base material 1. Then one or more other sheets of the bakelized paper is applied to the opposite or bottom face of the base material, the number of sheets so applied depending on the combined thickness of the layers of paper and granular substance on the upper surface.

The sheets thus assembled are now placed in a hydraulic press, equipped with hollow platens into which steam and water can be admitted through proper connections. Moreover, pressure plates are placed in contact with the opposite sides of the assembled materials, the lower or bottom plate having a smooth polished surface while the plate in contact with the top surface of the material having its surface ribbed after the manner of a die plate, so that intersecting grooves 5, 5 will be impressed into the surface and dividing it into squares to give the appearance of a tiled surface.

Where the sheets are to be provided with the tongues 6 and grooves 7, along their edges, additional die plates are required, these surrounding the edges of the sheets and forced inwardly at the same time the pressure is applied in the direction of the thickness of the sheet, thus forming the tongues along one side and end edge and grooves along the opposite edges.

The pressure is now applied to the material and at the same time steam is admitted to the platens raising the temperature to a degree sufficient to fuse the bakelite, this treatment being carried on for several minutes at a pressure of from 50 to 100 pounds per square inch, depending on the density to which the base material is to be reduced. Before the pressure is relieved, however, the steam is shut off and water is circulated through the platens for a short period, thus reducing the temperature to normal, whereupon platens are parted and the sheet removed.

As the result of this pressure and heat treatment the several layers of material are solidly compressed together and become a hard unyielding mass, due to the bakelite which under the effect of the heat becomes fused, and when cooled takes the form of a hard, waterproof film uniting the several layers and penetrating the base material to considerable depth. Similarly the granules of mineral are bound together in the fused bakelite forming a homogeneous coating having a hard wear-resisting surface.

Various tones and color effects can be introduced by using colored varieties of granite, quartz or marble, or by mixing a colored filler with the granules. For instance, a filler composed of equal parts of wood flour and pulverized bakelite to which the desired coloring matter is added, can be mixed with the granular mineral substantce to give the desired shade or color.

The process of manufacture thus set forth is manifestly subject to various changes and departures, although the foregoing provides a very economical and satisfactory method. The preparation of the mineral body upon the sheet of bakelized paper is preferred to applying it directly to the fibrous base for the reason that it can be made up in large areas to be cut to sheet size, or if desired, can be divided into smaller sections in any desired shape such as squares, diamond or hexagonal shapes and assembled on the sheets of the base material. This method can be used where the effect of different colors or shades of tile is to be produced, as by using vari-colored minerals. Surface finish is likewise a matter of choice. The natural finish of the material as it comes from the press is glossy due to the bakelite, and while the gloss is removed by wear it is often preferable to reduce the surface to a uniform dull finish by a moderate sand-blasting process.

Having set forth a preferred embodiment of my invention,

I claim:

1. A flooring composition comprising a base of fibrous material, having its surfaces impregnated with bakelite and a layer composed of a granular mineral substance and fused bakelite covering one surface of said base material.

2. A flooring composition comprising a base of compressed fibrous material and a coating of granulated mineral on one surface of said base, said coating and the surfaces of said base being impregnated with bakelite rendered hard and infusible by heat.

3. A flooring composition comprising a composite base consisting of a compressed cellulose fibrous material, included between layers of bakelite impregnated paper, and a layer of pulverized mineral substance and fused bakelite over one surface of said base.

4. A flooring composition comprising a base of fibrous material, sheets of bakelite impregnated paper applied to the surfaces of said base and a layer of granulated mineral and fused bakelite applied to one of the surface sheets.

5. A process for producing a composite flooring material consisting of impregnating the surfaces of a sheet of fibrous material with bakelite, applying a coating of granular mineral substance to a surface of said sheet, the same having been impregnated with bakelite and compressing said coated sheet in the presence of heat sufficient to fuse the bakelite.

6. A process for producing a composite flooring material consisting of impregnating sheets of paper with bakelite, applying a coating of granular mineral substance to a surface of one of said sheets, the same having been impregnated with bakelite, applying coated and uncoated sheets against opposite surfaces of a base consisting of a sheet of cellulose fibrous material and compressing the assembled materials in the presence of heat sufficient to fuse the bakelite.

7. A process of producing a composite flooring material consisting of treating a sheet of cellulose fibrous substance with a solution of bakelite and drying the same, similarly treating sheets of paper with a bakelite solution, preparing a mixture of a mineral in granular form and bakelite, assembling the materials with the fibrous base material between sheets of the bakelized paper, one of said sheets having been coated with a layer of the bakelite-treated mineral, and compressing the assembled materials in the presence of heat sufficient to fuse the bakelite.

8. A process of producing a composite flooring material consisting of treating a sheet of cellulose fibrous substance with a solution of bakelite and drying the same, similarly treating sheets of paper with a bakelite solution, applying a coating to one of said sheets of paper composed of a mineral substance in granular form, in which each granule has been coated with the bakelite solution and dried, assembling the materials with the fibrous base material between a sheet of uncoated bakelized paper and a sheet of the mineral coated bakelized paper, and compressing the assembled materials in the presence of heat sufficient to fuse the bakelite.

9. A process of producing a composite flooring material consisting of impregnating sheets of compressed fibrous base material of substantial thickness, sheets of paper and a granular mineral substance with a bakelite solution, and drying the same to drive off the solvent in the bakelite solution, applying a layer of the bakelized mineral substance to a sheet of said bakelized paper, assembling a sheet of the fibrous base material between sheets of the uncoated and mineral coated bakelized paper, and compressing the assembled materials in a press in the presence of heat sufficient to fuse the bakelite.

10. A process of producing a composite flooring material consisting of separately impregnating sheets of compressed fibrous base material of substantial thickness, sheets of paper and a granular mineral substance with a bakelite solution, and drying the same to drive off the solvent in the bakelite solution, applying a layer of the bakelized mineral substance to a sheet of said bakelized paper, assembling a sheet of the fibrous base material between sheets of the uncoated and mineral coated bakelized paper, and compressing the assembled materials in a press applying heat to the materials while under pressure and at a temperature sufficient to fuse the bakelite and cooling the material before removing the same from the press.

Signed at Dubuque, Ia., this 2nd day of June, 1930.

EMIL C. LOETSCHER.